US008692844B1

(12) United States Patent
Molnar et al.

(10) Patent No.: US 8,692,844 B1
(45) Date of Patent: Apr. 8, 2014

(54) METHOD AND SYSTEM FOR EFFICIENT ANTIALIASED RENDERING (75) Inventors: Steven E. Molnar, Chapel Hill, NC (US); David B. Kirk, Santa Clara, CA (US); John Stephen Montrym, Los Altos, CA (US); Douglas A. Voorhies, Menlo Park, CA (US)

(73) Assignee: NVIDIA Corporation, Santa Clara, CA (US)

( * ) Notice: Subject to any disclaimer, the term of this patent is extended or adjusted under 35 U.S.C. 154(b) by 407 days.

(21) Appl. No.: 09/675,099

(22) Filed: Sep. 28, 2000

(51) Int. Cl.
*G09G 5/00* (2006.01)
*G06T 11/20* (2006.01)
*G06T 11/40* (2006.01)
*G09G 5/14* (2006.01)

(52) U.S. Cl.
CPC ............... *G06T 11/203* (2013.01); *G06T 11/40* (2013.01); *G09G 5/14* (2013.01)
USPC ........... 345/611; 345/612; 345/613; 345/614; 345/629; 345/581; 345/582

(58) Field of Classification Search
CPC ............................. G06T 11/203; G06T 11/40
USPC ......... 345/611–614, 615, 536, 539, 545, 546, 345/552, 419, 581, 629, 506, 582; 382/269, 382/255, 275, 166, 174, 194, 199
See application file for complete search history.

(56) References Cited

U.S. PATENT DOCUMENTS 5,081,594 A 1/1992 Horsley
5,313,287 A 5/1994 Barton (Continued)

FOREIGN PATENT DOCUMENTS

CN 101093578 12/2007

OTHER PUBLICATIONS

Fuchs; "Fast Spheres Shadow, Textures, Transparencies, and Image Enhancements in Pixel-Planes"; ACM; 1985; Department of Computer Science, University of North Carolina at Chapel Hill, Chapel Hill, NC 27514.

(Continued)

*Primary Examiner* — Jin-Cheng Wang (57) ABSTRACT

A method and system are disclosed for antialiased rendering a plurality of pixels in a computer system. The method and system comprise providing a fixed storage area and providing a plurality of sequential format levels for the plurality of pixels within the fixed storage area. The plurality of format levels represent pixels with varying degrees of complexity in subpixel geometry visible within the pixel. A system and method in accordance with the present invention provides at least the following format levels: one-fragment format, used when one surface fully covers a pixel; two-fragment format, used when two surfaces together cover a pixel; and multi-sample format, used when three or more surfaces cover a pixel. The method and system further comprise storing the plurality of pixels at a lowest appropriate format level within the fixed storage area, so that a minimum amount of data is transferred to and from the fixed storage area. The method and system further comprise procedures for converting pixels from one format level to take into account newly rendered pixel fragments. All formats represent depth values in a consistent manner so that fragments rendered during later rendering passes match depth values resulting from rendering the same primitive in earlier passes. Thus, the invention enables high-quality antialiasing with minimal data transferred to and from the fixed storage area, while supporting multi-pass rendering.

39 Claims, 10 Drawing Sheets

| Field | Size (bits) | Description |
|---|---|---|
| rgba | 32 | Resolved RGBA color for the pixel. |
| z/stencil0 | 32 | 24-bit Z and 8-bit stencil value of sample 0 (the most distant sample). |
| fmt | 2 | 2-bit code indicating multisample format (0b10). |
| select | 2 | 2-bit code indicating which of the three samples is stored as sample 0. |
| rgba0 | 28 | RGBA color of sample 0. |
| z/stencil1 | 32 | 24-bit Z and 8-bit stencil value of sample 1. |
| z/stencil2 | 32 | 24-bit Z and 8-bit stencil value of sample 2. |
| rgba1 | 32 | RGBA color of sample 1. |
| rgba2 | 32 | RGBA color of sample 2. |

(56) References Cited

U.S. PATENT DOCUMENTS

| | | | |
|---|---|---|---|
| 5,452,104 A | 9/1995 | Lee | |
| 5,594,854 A | 1/1997 | Baldwin et al. | |
| 5,623,692 A | 4/1997 | Priem et al. | |
| 5,664,162 A | 9/1997 | Dye | |
| 5,854,631 A * | 12/1998 | Akeley et al. | 345/419 |
| 5,854,637 A | 12/1998 | Sturges | |
| 6,072,500 A * | 6/2000 | Foran et al. | 345/611 |
| 6,104,407 A | 8/2000 | Aleksic et al. | |
| 6,104,417 A * | 8/2000 | Nielsen et al. | 345/542 |
| 6,115,049 A * | 9/2000 | Winner et al. | 345/611 |
| 6,118,394 A | 9/2000 | Onaya | |
| 6,128,000 A * | 10/2000 | Jouppi et al. | 345/614 |
| 6,137,918 A * | 10/2000 | Harrington et al. | 382/269 |
| 6,160,559 A | 12/2000 | Omtzigt | |
| 6,188,394 B1 | 2/2001 | Morein et al. | |
| 6,201,545 B1 | 3/2001 | Wong et al. | |
| 6,204,859 B1 * | 3/2001 | Jouppi et al. | 345/592 |
| 6,219,070 B1 | 4/2001 | Baker et al. | |
| 6,249,853 B1 | 6/2001 | Porterfield | |
| 6,359,623 B1 | 3/2002 | Larson | |
| 6,362,819 B1 * | 3/2002 | Dalal et al. | 345/423 |
| 6,366,289 B1 | 4/2002 | Johns | |
| 6,429,877 B1 * | 8/2002 | Stroyan | 345/611 |
| 6,437,780 B1 | 8/2002 | Baltaretu et al. | |
| 6,452,595 B1 * | 9/2002 | Montrym et al. | 345/426 |
| 6,469,707 B1 * | 10/2002 | Voorhies | 345/589 |
| 6,480,205 B1 * | 11/2002 | Greene et al. | 345/631 |
| 6,501,564 B1 | 12/2002 | Schramm et al. | |
| 6,504,542 B1 | 1/2003 | Voorhies et al. | |
| 6,522,329 B1 | 2/2003 | Ihara et al. | |
| 6,525,737 B1 | 2/2003 | Duluk, Jr. et al. | |
| 6,606,093 B1 | 8/2003 | Gossett et al. | |
| 6,614,444 B1 * | 9/2003 | Duluk et al. | 345/581 |
| 6,624,823 B2 | 9/2003 | Deering | |
| 6,633,297 B2 * | 10/2003 | McCormack et al. | 345/506 |
| 6,646,639 B1 | 11/2003 | Greene et al. | |
| 6,671,000 B1 | 12/2003 | Cloutier | |
| 6,693,639 B2 | 2/2004 | Duluk, Jr. et al. | |
| 6,697,063 B1 | 2/2004 | Zhu | |
| 6,717,578 B1 * | 4/2004 | Deering | 345/428 |
| 6,734,861 B1 | 5/2004 | Van Dyke et al. | |
| 6,741,247 B1 | 5/2004 | Fenney | |
| 6,765,575 B1 | 7/2004 | Voorhies et al. | |
| 6,778,177 B1 | 8/2004 | Furtner | |
| 6,798,410 B1 | 9/2004 | Redshaw et al. | |
| 6,833,835 B1 | 12/2004 | van Vugt | |
| 6,906,716 B2 | 6/2005 | Moreton et al. | |
| 6,938,176 B1 | 8/2005 | Alben et al. | |
| 6,940,514 B1 | 9/2005 | Wasserman et al. | |
| 6,947,057 B2 | 9/2005 | Nelson et al. | |
| 6,956,579 B1 | 10/2005 | Diard et al. | |
| 6,961,057 B1 | 11/2005 | Van Dyke et al. | |
| 7,009,607 B2 | 3/2006 | Lindholm et al. | |
| 7,009,615 B1 | 3/2006 | Kilgard et al. | |
| 7,064,771 B1 * | 6/2006 | Jouppi et al. | 345/614 |
| 7,075,542 B1 | 7/2006 | Leather | |
| 7,081,902 B1 | 7/2006 | Crow et al. | |
| 7,119,809 B1 | 10/2006 | McCabe | |
| 7,154,066 B2 | 12/2006 | Talwar et al. | |
| 7,158,148 B2 | 1/2007 | Toji et al. | |
| 7,170,515 B1 | 1/2007 | Zhu | |
| 7,184,040 B1 | 2/2007 | Tzvetkov | |
| 7,453,466 B2 | 11/2008 | Hux et al. | |
| 7,548,996 B2 | 6/2009 | Baker et al. | |
| 7,551,174 B2 | 6/2009 | Iourcha et al. | |
| 7,791,617 B2 | 9/2010 | Crow et al. | |
| 2001/0005209 A1 | 6/2001 | Lindholm et al. | |
| 2002/0050979 A1 | 5/2002 | Oberoi et al. | |
| 2002/0140655 A1 | 10/2002 | Liang et al. | |
| 2002/0158885 A1 | 10/2002 | Brokenshire et al. | |
| 2002/0196251 A1 | 12/2002 | Duluk, Jr. et al. | |
| 2003/0067468 A1 | 4/2003 | Duluk, Jr. et al. | |
| 2003/0122815 A1 | 7/2003 | Deering | |
| 2003/0194116 A1 | 10/2003 | Wong et al. | |
| 2003/0201994 A1 | 10/2003 | Taylor et al. | |
| 2004/0085313 A1 | 5/2004 | Moreton et al. | |
| 2004/0183801 A1 | 9/2004 | Deering | |
| 2004/0196285 A1 | 10/2004 | Rice et al. | |
| 2004/0207642 A1 | 10/2004 | Crisu et al. | |
| 2004/0246251 A1 | 12/2004 | Fenney et al. | |
| 2005/0041037 A1 | 2/2005 | Dawson | |
| 2005/0134588 A1 | 6/2005 | Aila et al. | |
| 2005/0134603 A1 | 6/2005 | Iourcha et al. | |
| 2005/0179698 A1 | 8/2005 | Vijayakumar et al. | |
| 2005/0259100 A1 | 11/2005 | Teruyama | |
| 2006/0170690 A1 | 8/2006 | Leather | |
| 2006/0203005 A1 | 9/2006 | Hunter | |
| 2006/0245001 A1 | 11/2006 | Lee et al. | |
| 2006/0267981 A1 | 11/2006 | Naoi | |
| 2008/0100618 A1 | 5/2008 | Woo et al. | |
| 2008/0273218 A1 | 11/2008 | Kitora et al. | |

OTHER PUBLICATIONS

A VLSI Architecture for Updating Raster-Scan Displays Satish Gupta, Robert F. Sproull, Ivan E. Sutherland Aug. 1981 ACM SIGGRAPH Computer Graphics, Proceedings of the 8th Annual Conference on Computer Graphics and Interactive Techniques SIGGRAPH '81, vol. 15 Issue Publisher: ACM Press, Aug. 1981.

A Parallel Alogorithm for Polygon Rasterization Juan Pineda Jun. 1988 ACM.

A Hardware Assisted Design Rule Check Architecture Larry Seiler Jan. 1982 Proceedings of the 19th Conference on Design Automation DAC '82 Publisher: IEEE Press, 1982.

Boyer, et al.; "Discrete Analysis for Antialiased Lines;" Eurographics 2000; 3 Pages.

Crow; "The Use of Grayscale for Improves Raster Display of Vectors and Characters;" University of Texas, Austin, Texas; Work supported by the National Science Foundation unser Grants MCS 76-83889; pp. 1-5: ACM Press, Aug. 1978.

* cited by examiner

| Field | Size (bits) | Description |
|---|---|---|
| rgba | 32 | Full-resolution RGBA color of the surface visible at the pixel. |
| z/stencil | 32 | 24-bit Z and 8-bit stencil values of the surface visible at the pixel (z is sampled at the pixel center). |
| fmt | 2 | 2-bit code indicating one-fragment format (0b00). |
| dZ | 24 | Z gradients with respect to x and y. |
| unused | 128 | Unused field (is not read or written). |

FIG. 3

| Field | Size (bits) | Description |
|---|---|---|
| rgba | 32 | Resolved RGBA color for the pixel. |
| z/stencil0 | 32 | 24-bit Z and 8-bit stencil value of fragment 0. |
| fmt | 2 | 2-bit code indicating two-fragment format (0b01). |
| unused | 6 | Unused field. |
| dZ0 | 24 | Z gradient for fragment 0. |
| z/stencil1 | 32 | 24-bit Z and 8-bit stencil value of fragment 1. |
| mask0 | 8 | 8bit subpixel coverage mask indicating the samples for which fragment 0 is visible. |
| dZ1 | 24 | Z gradient for fragment 1. |
| rgba0 | 32 | RGBA color of fragment 0. |
| rgba1 | 32 | RGBA color of fragment 1. |

FIG. 4

| Field | Size (bits) | Description |
|---|---|---|
| rgba | 32 | Resolved RGBA color for the pixel. |
| z/stencil0 | 32 | 24-bit Z and 8-bit stencil value of sample 0 (the most distant sample). |
| fmt | 2 | 2-bit code indicating multisample format (0b10). |
| select | 2 | 2-bit code indicating which of the three samples is stored as sample 0. |
| rgba0 | 28 | RGBA color of sample 0. |
| z/stencil1 | 32 | 24-bit Z and 8-bit stencil value of sample 1. |
| z/stencil2 | 32 | 24-bit Z and 8-bit stencil value of sample 2. |
| rgba1 | 32 | RGBA color of sample 1. |
| rgba2 | 32 | RGBA color of sample 2. |

METHOD AND SYSTEM FOR EFFICIENT ANTIALIASED RENDERING

FIELD OF THE INVENTION

The present invention relates generally to an antialiasing scheme for a computer system and more particularly to providing an antialiasing scheme that maximizes perceived filtering of rendered pixels, while minimizing memory bandwidth requirements and providing compatibility with applications that render in multiple passes.

BACKGROUND OF THE INVENTION

Computer systems are utilized extensively to render objects on a display screen. As is well known, typical rendering systems require some form of antialiasing to remove the jagged edges that are present when images are rendered with a single point-sample per pixel. There are two general approaches for antialiasing images.

Supersampling/Multisampling

The simplest approach is to sample the image at multiple sample points per pixel, effectively computing a high resolution image, which is filtered down by averaging the samples within a pixel or using a weighted average of samples based on a filter kernel. This scheme is called supersampling. Supersampling is simple and robust, but has disadvantages of requiring rendering time, frame-buffer storage costs, and frame-buffer bandwidth costs that are proportional to the number of samples per pixel. Typically, between four and 16 samples per pixel are required for acceptable results, so the overall cost of supersampling is roughly four to 16 times that of normal rendering.

Multisampling is a variant of supersampling. As in supersampling, the scheme provides storage for multiple samples per pixel and the final image is computed by filtering the samples per pixel. However, in multisampling, rather than computing the color and depth value for each sample independently, a single color and depth (perhaps including slope information) is computed at the center of each pixel, along with a coverage mask indicating which samples are covered by the primitive being rendered. The sample locations indicated by the mask, and which pass the depth test, are then updated using the single shared color for all samples within the pixel. Multisampling reduces rendering costs to little more than that of normal rendering, but the storage and bandwidth costs are the same as for supersampling.

A-Buffer

The second general scheme for generating antialiased images is referred to as the A-buffer. An A-buffer scheme maintains, for each pixel, a list of "fragments" from surfaces that are potentially visible at the pixel. A fragment generally consists of color information, depth information, and coverage information that describe the contribution of a surface to a pixel. Depth information may consist of a single depth value or a depth value and slopes. Coverage normally consists of a coverage bitmask, indicating which of a set of subpixel sample points the fragment covers, but it may also contain a coverage fraction. In the most general A-buffer scheme, the fragment list stores information for every surface that is potentially visible at a pixel. Since there is no bound to the number of surfaces that can be visible at a pixel, the fragment list can become arbitrarily large. The A-buffer scheme allows for high-quality antialiasing with storage and bandwidth costs that are proportional to the complexity at each pixel. However, supporting variable and potentially unbounded amounts of information per pixel adds significant costs and complexity to the overall system. Furthermore, provisions must be made to handle scenes that are too complex to be represented using the finite resources available in a given system.

Reduced A-buffer algorithms have been proposed which limit the number of fragments per pixel to some small number, typically two to four fragments per pixel, providing many of the advantages of A-buffering with the fixed memory requirements of supersampling/multisampling. Typically, when a fragment is introduced which exceeds the fixed number of fragments that can be stored, the two fragments that are most similar (based on criteria such as coverage, depth, similarity of color, or combinations of these) are merged to form a single fragment.

Reduced A-buffer algorithms are appealing because of their low storage costs. However, artifacts can result from merging fragments. Additional fragments that lie between two fragments that have been merged will be handled incorrectly.

Multi-pass rendering, in which objects are rendered multiple times to apply multiple textures or perform complex shading, can also lead to artifacts. Multipass rendering generally uses a depth-equality test during second and third passes to identify pixels that should participate in the multipass update. If fragments are merged during the initial rendering pass, the depth values of fragments in later passes will not match, so pixel values will not be updated as intended.

Fragment merging effectively changes the subpixel geometry of the scene. As can be understood from the above, a variety of other types of artifacts can result from this changed subpixel geometry. This is a serious limitation of previous reduced A-buffer algorithms.

Accordingly, what is desired is an antialiasing scheme that combines the advantages of the reduced A-buffer algorithm's low fixed-storage requirements, and supersampling/multisampling's robustness for complex images and support for multipass algorithms. The system should be easy to implement, cost-effective, and fit within the framework of existing systems. The present invention addresses this need.

SUMMARY OF THE INVENTION

A method and system for antialiased rendering of a plurality of pixels in a computer system is disclosed. The method and system comprise providing a fixed storage area and providing a plurality of sequential format levels for the plurality of pixels within the fixed storage area. The method and system further comprise storing the plurality of pixels at a lowest appropriate format level within the fixed storage area. The method and system further comprise algorithms for merging a plurality of newly rendered fragments with the plurality of stored pixels and for resolving the plurality of pixels into a plurality of pixel colors that may be displayed.

More particularly, in a system and method in accordance with the present invention, pixels are represented in the following formats:

(a) One-fragment format (one surface is visible at the pixel).

(b) Two-fragment format (two surfaces are visible at the pixel).

(c) Multisample format (three or more surfaces are visible at the pixel).

Newly rendered fragments are merged with pixels such that the merged pixel is represented using the simplest format capable of representing the surfaces visible at the pixel. Simpler formats require less frame buffer bandwidth while complex formats require more bandwidth. The present invention minimizes frame buffer bandwidth while supporting high image quality.

The system and method perform accurate and repeatable sampling of surface depth values, so that if the same surfaces are rendered in a subsequent pass, the depth values match the corresponding depth values stored in the plurality of pixels. A resolved color buffer is maintained at all times so that applications can query current pixel values without requiring an explicit resolution pass.

Accordingly, through a system and method in accordance with the present invention, high-quality antialiasing can be performed with a minimal increase in frame buffer bandwidth and multi-pass rendering can be performed without artifacts.

DETAILED DESCRIPTION

The present invention relates generally to an antialiasing scheme for a computer system and more particularly to providing an antialiasing scheme which maximizes perceived filtering quality of rendered pixels, while minimizing memory requirements and providing compatibility with applications that render in multiple passes.

The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown, but is to be accorded the widest scope consistent with the principles and features described herein.

Figure 1:
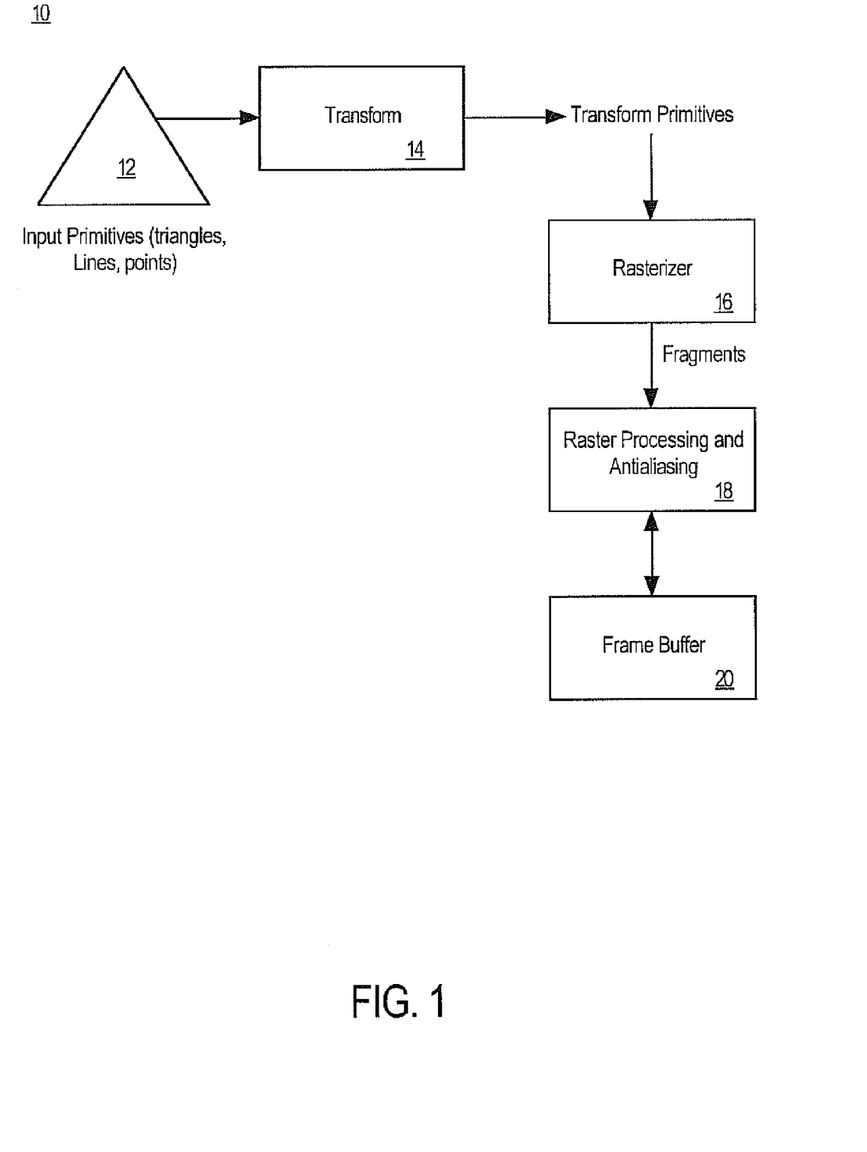
FIG. 1 is a simple high level block diagram of a system for rendering images.

Computer systems are utilized extensively to render objects on a display screen. Typically this rendering is accomplished through operation of a graphics processing system. FIG. 1 is a simple high level block diagram of a system 10 for rendering images. System 10 includes a plurality of input primitives 12 (such as triangles, lines and points), which are provided to a transform block 14. The transform block 14 transforms the input primitives from their native coordinate system into screen coordinates. These transformed primitives are then provided to a rasterizer 16. The rasterizer 16 computes the contribution of each primitive to each pixel in the form of fragments. These fragments are forwarded to a raster processing and antialiasing system 18. Each fragment includes the contribution of a primitive to a pixel. For example, a fragment typically includes color (RGB), opacity (alpha), depth (z, possibly z slopes) and coverage (coverage mask) information. This fragment information is then processed and antialiased in the raster processing and antialiasing system 18. A frame buffer 20 provides data to and receives information from the raster processing and antialiasing system 18. The frame buffer accumulates subpixel information needed for antialiasing and visibility testing. The frame buffer can reside on the same chip as the raster processing and antialiasing system, or it can reside in an external memory. Either at rasterization time, or after the scene has been fully rasterized, the subpixel information stored in the frame buffer is merged or filtered to compute a final image of the scene.

An ideal antialiasing system has the following properties:

(1) Small, fixed amount of storage for pixel data.

(2) Minimal frame buffer bandwidth. Ideally, frame buffer bandwidth should approach that of non-antialiased rendering for regions of the image that contain no edges.

(3) High quality filtering for the common single-edge-in-pixel case.

(4) Robustness against artifacts. The algorithm should robustly handle pixels with many primitives visible, such as can occur when primitives are small or at the center vertex of a triangle fan. Background colors should not bleed through seams of foreground surfaces and colors in meshes of tiny triangles should remain intact.

(5) Accuracy and repeatability of depth values. Antialiased Z values should have the same precision and accuracy as non-antialiased Z values, since antialiasing is intended to improve image quality, not reduce it. Z values must be adjusted appropriately at subpixel positions to avoid punch-through artifacts. For multipass-rendering algorithms to work, Z values of fragments in later passes must match those stored in the frame buffer from earlier passes.

(6) Inexpensive and simple to implement.

As described above, previous approaches to antialiasing fall short in various regards. Multisampling is robust, but requires excessive frame-buffer storage and bandwidth for high-quality results in the single-edge-in-pixel case. A-buffer algorithms conserve bandwidth and handle the single-edge-in-pixel case. However, conventional A-buffer algorithms require unbounded storage. Fixed-storage A-buffer schemes come closest to fulfilling the requirements, but artifacts result when the number of surfaces visible in the pixel exceeds the fragment storage available: potentially visible fragments cannot be thrown away, but merging fragments can cause bleed-through artifacts or Z mismatch artifacts during multipass rendering.

Therefore, what is needed is a system that is efficient in terms of bandwidth and storage, produces high-quality results for the single-edge-in-pixel case, and avoids the artifacts mentioned above. This invention addresses this need.

In the preferred embodiment described below, pixels are represented in the following formats:

(a) One-fragment format (one surface is visible at the pixel).

(b) Two-fragment format (two surfaces are visible at the pixel).

(c) Multisample format (three or more surfaces are visible at the pixel).

The representation has the following advantages. One-fragment format is a compact representation of the common simple pixel case, resulting in bandwidth savings. Two-fragment format allows pixels with a single edge to be represented accurately. If z slope values are maintained, the slopes can be used to compute accurate intersections of interpenetrating objects. Multisample format is used for pixels that are too complex to be represented in one of the other formats. Through multisampling, the surface of the pixel can be accurately sampled at a discrete number of locations, rather than merging surfaces, which can cause visibility errors and/or interfere with multipass texturing. This embodiment uses three samples in multisample format, but other embodiments could use as few as two or as many as five or more. Multisample pixels typically occur at vertices in a tessellated mesh, where primitive colors are consistent, or at complex intersections of surfaces, where fragment colors often are disparate and noise is less noticeable. Two-fragment and multisample pixels can be converted back to simple pixel representation when a surface fully occludes the pixel, as will be explained in detail later.

To more particularly describe the features of the present invention, refer now to the following description in conjunction with the accompanying Figures.

Figure 2:
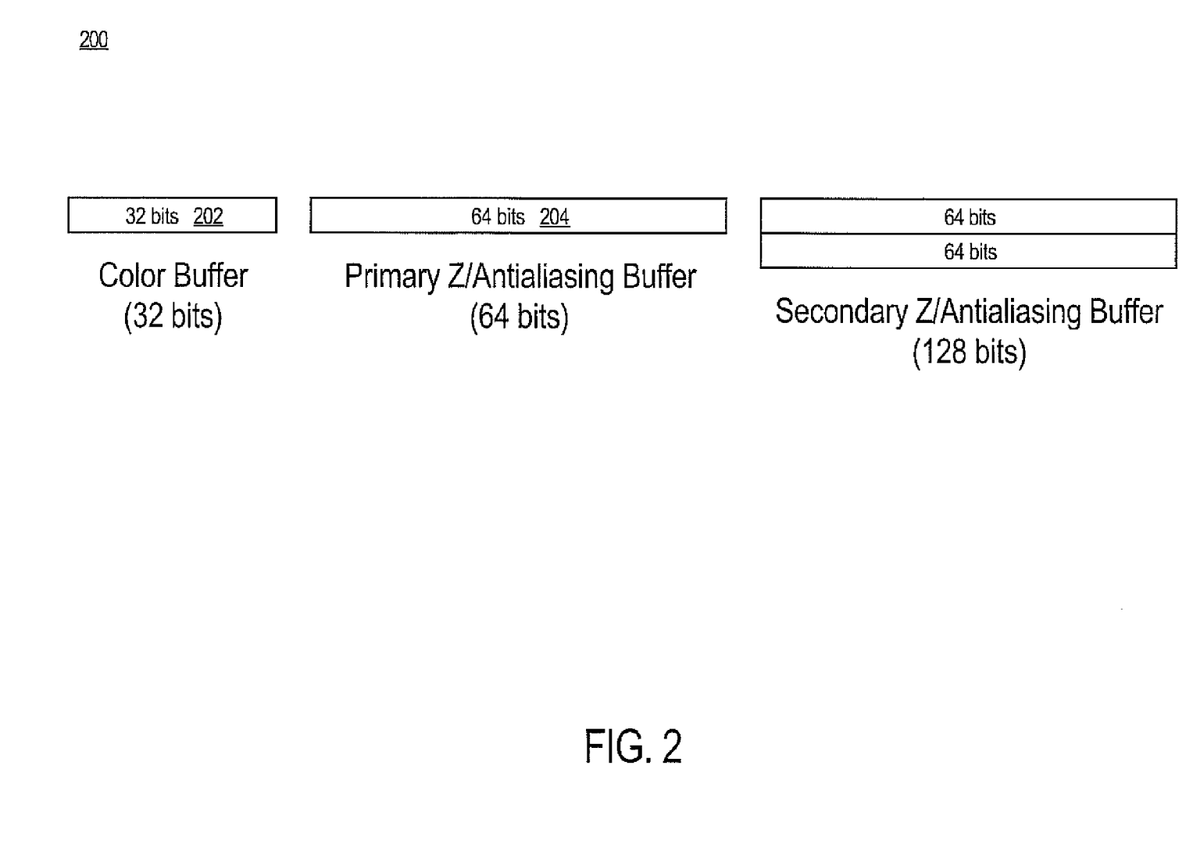
FIG. 2 illustrates the three storage buffers within the fixed storage area of the frame buffer.
Figure 2A:
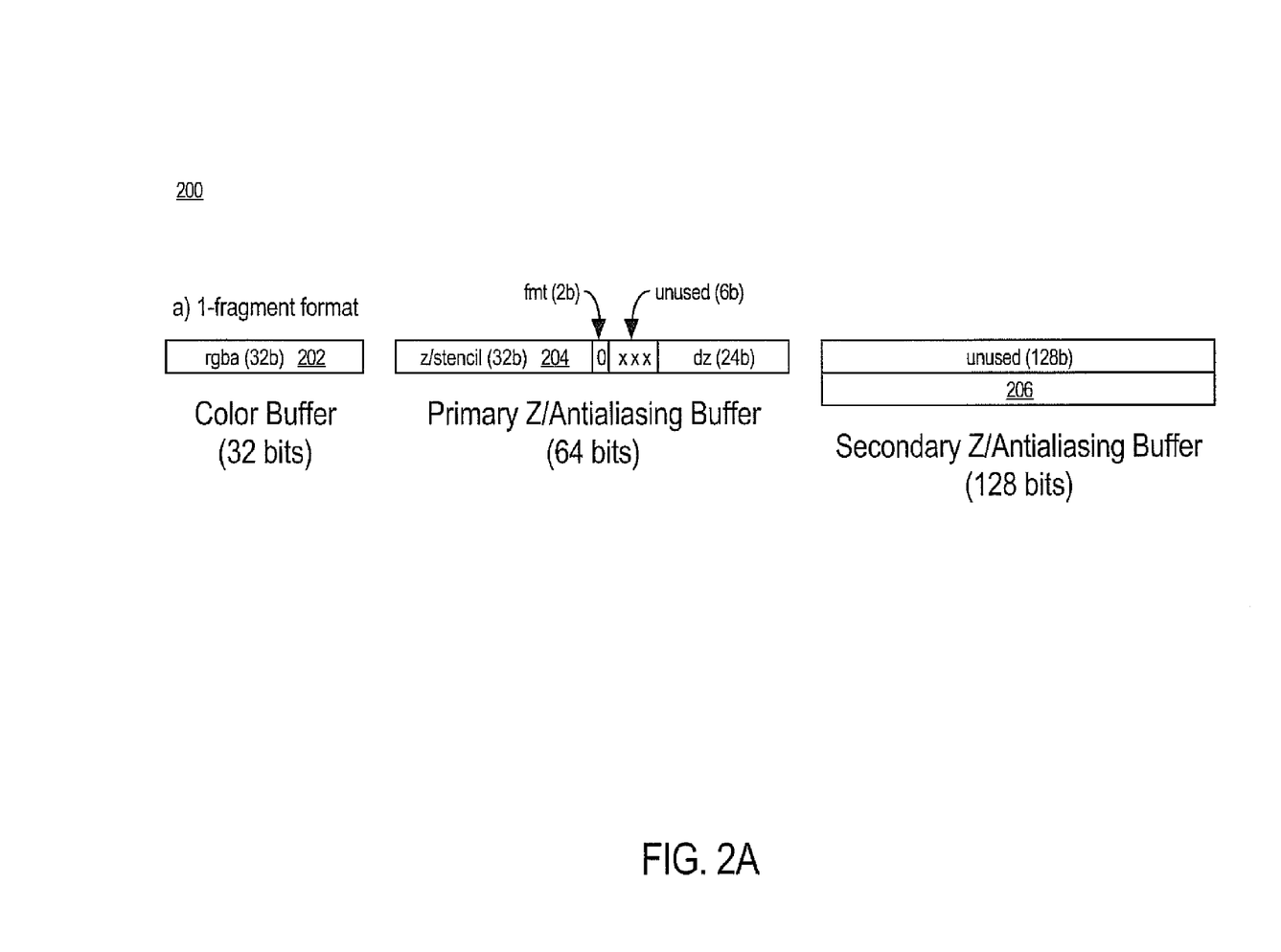
FIGS. 2a-2c show the contents of the three storage buffers for each pixel format.
Figure 2B:
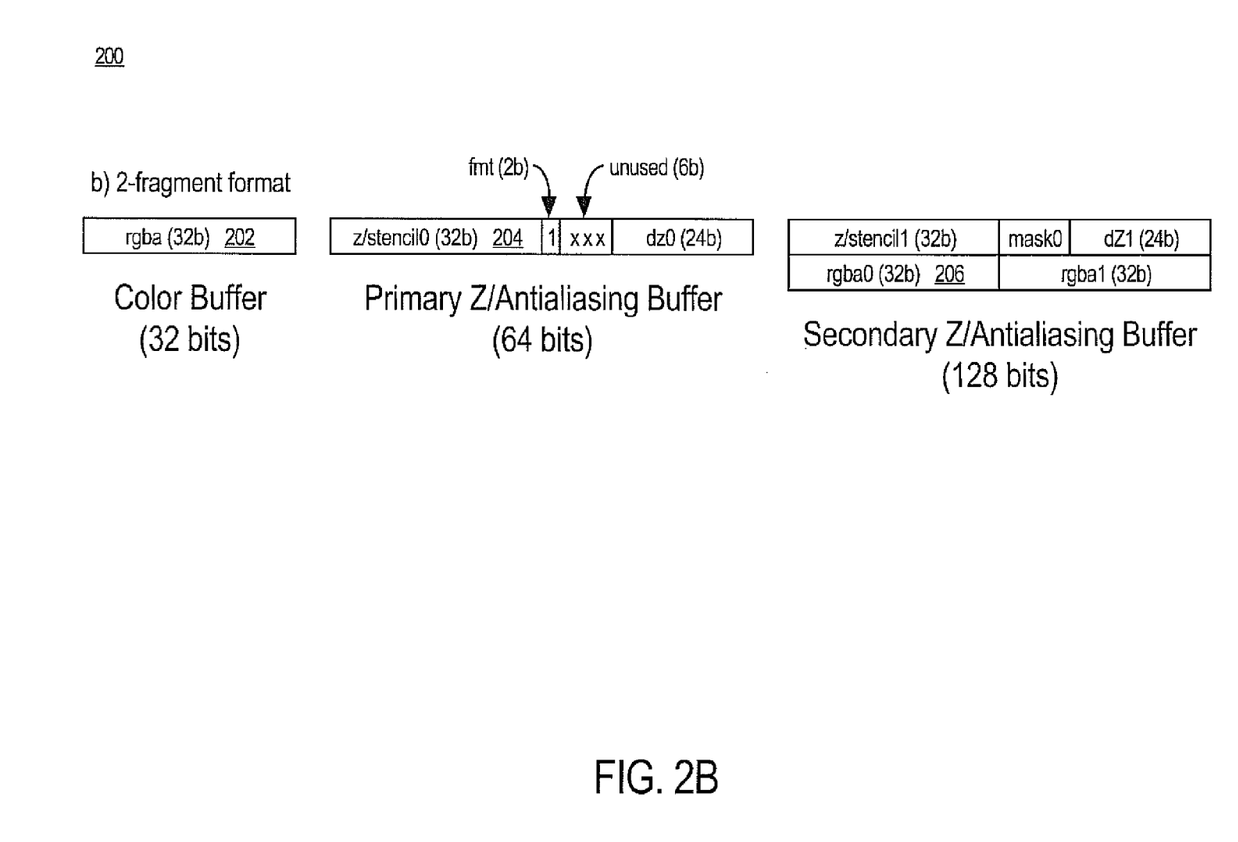
Figure 2C:
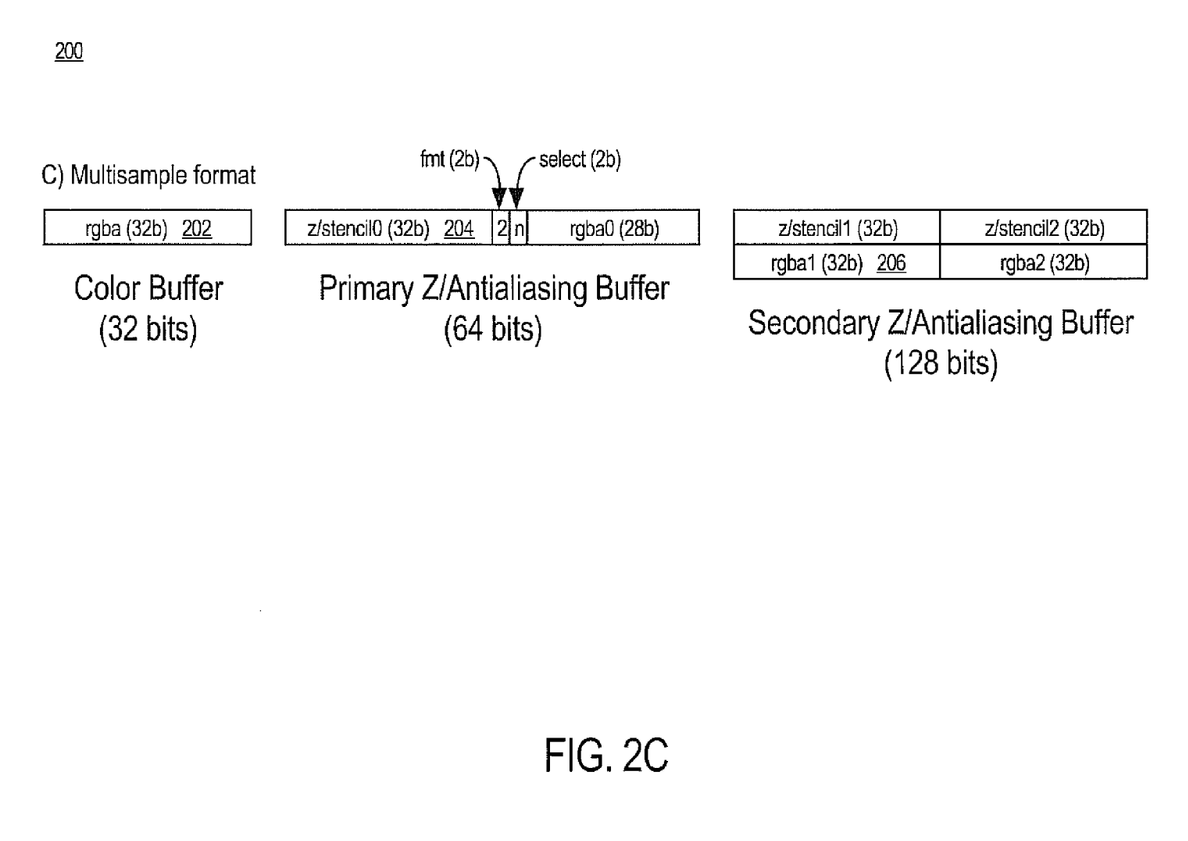

FIG. 2 illustrates the storage provided in the frame buffer 200 in a preferred embodiment in accordance with the present invention. The frame buffer 200 contains three storage buffers for pixel data: a color buffer 202 storing 32 bits of color data per pixel, a primary Z/antialiasing buffer 204 storing 64 bits of data per pixel, and a secondary Z/antialiasing buffer 206 storing 128 bits of data per pixel. FIGS. 2a-2c show the contents of the three storage buffers 202, 204 and 206 for each pixel format.

The color buffer 202 always contains a resolved pixel color for each pixel, allowing the buffer to be displayed directly without a separate resolve step.

The primary Z/antialiasing buffer 204 (called 'primary buffer') contains sufficient storage to fully represent one-fragment pixels, including a flag indicating the pixel format.

The secondary Z/antialiasing buffer 206 (called 'secondary buffer') contains additional storage needed for pixels in two-fragment-format or multisample-format. It only needs to be read or written for pixels that have been determined to be complex.

In systems that perform double- or triple-buffering, only the color buffer needs to be double- or triple-buffered.

The buffer sizes and formats in this preferred embodiment have been designed for rendering pixels with 8-bit RGBA color components and 24-bit Z/8-bit stencil values. One of ordinary skill in the art will readily recognize that a variety of representations for color, Z, and stencil are possible and that color, primary, and secondary buffer formats could be adapted in a straightforward way to accommodate other representations of color, Z, and stencil.

Using these three buffers 202, 204 and 206, pixels can be represented in the three formats above. The format is chosen based on the number of fragments visible at the pixel. The formats are described in detail below.

One-Fragment Format.

Figure 3:
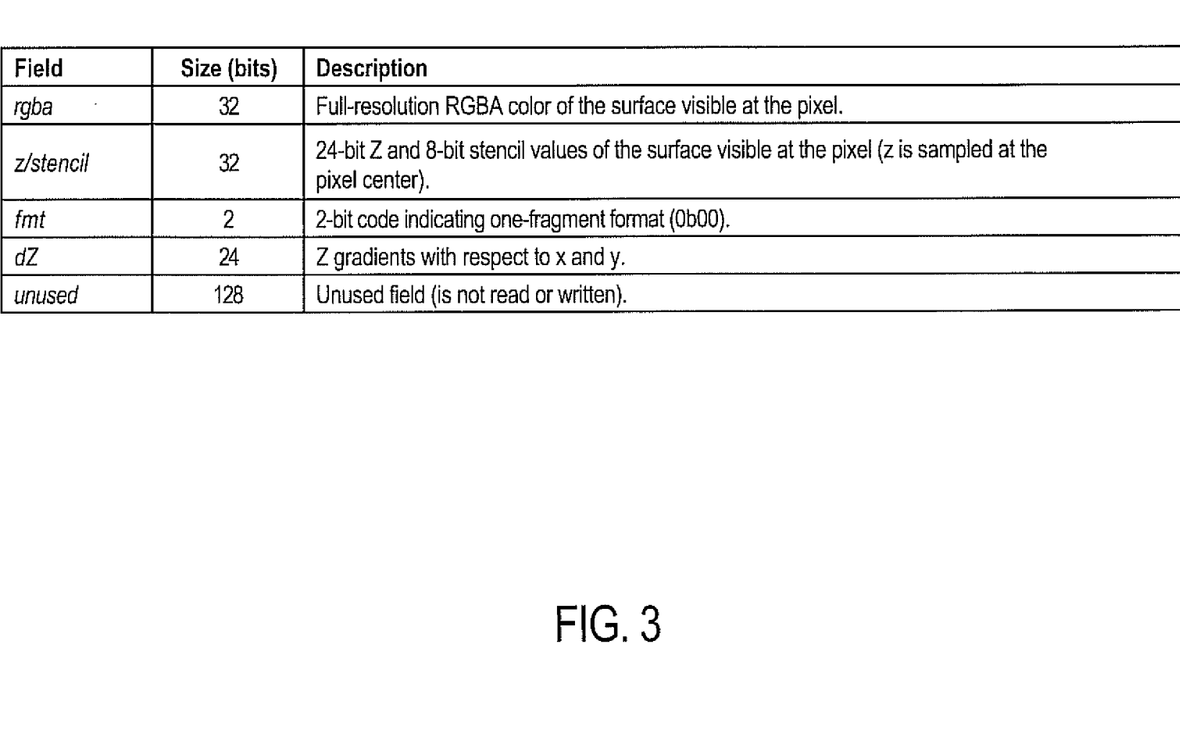
FIG. 3 illustrates storage of pixel data in one-fragment format.

One-fragment format is used to represent pixels that are fully covered by a single surface. In most scenes, the vast majority of pixels are of this type. In this preferred embodiment, pixel data in one-fragment format is stored as shown in FIGS. 2a and 3.

In, this preferred embodiment, Z gradients are stored in floating-point format with a separate mantissa and sign bit for dz/dx and dz/dy and a shared exponent. One encoding that has been found to be adequate is: 6 bits for the common exponent, 1 bit for the sign of dz/dx, 1 bit for the sign of dz/dy, and 8 bits for the mantissa of dz/dx and dz/dy. One skilled in the art will recognize that a variety of encodings of Z gradients are possible.

Two-Fragment Format.

Two-fragment format is used to represent pixels that are covered by exactly two surfaces. The two-fragment situation arises at seams between primitives that form a mesh and at the silhouette edge of an object in front of a background surface.

Figure 4:
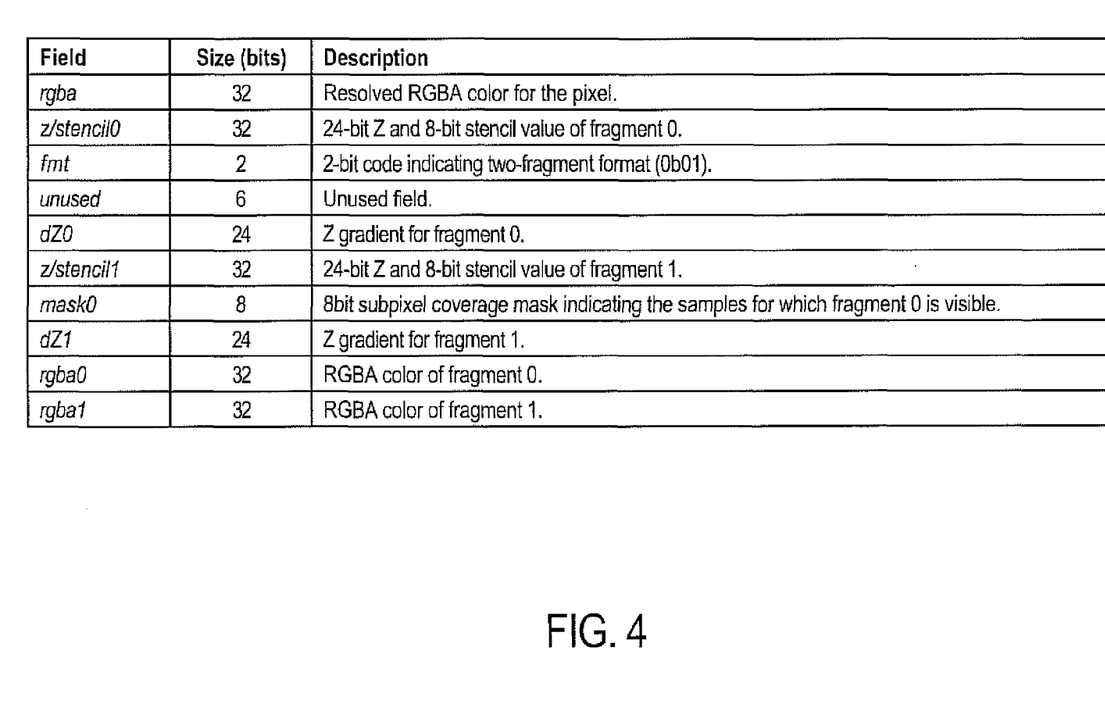
FIG. 4 illustrates storage of pixel data in two-fragment format.

In this preferred embodiment, data within two-fragment pixels is stored as shown in FIGS. 2b and 4.

Given two fragments, we choose the fragment with the most distant covered sample to be fragment 0. By storing the Z and Z gradient data for fragment 0 in the primary buffer 204 (FIG. 2b), a new fragment that lies entirely behind fragment 0 can be rejected as non-visible by inspecting the primary buffer 204 alone. If scenes are loosely ordered front-to-back, this can significantly reduce memory bandwidth. Note that we could have made the opposite choice: choose the fragment with the nearest covered sample as fragment 0. That would allow a new fully-covering fragment to trivially overwrite a two-fragment pixel without examining the secondary buffer 206. The resolved color is computed by performing a weighted average of the two fragment colors based on their respective fractional coverage.

Multisample Format.

Multisample format is used to represent pixels in which more than two surfaces are visible. This is a rare case in most scenes, typically occurring at pixels that contain vertices of tessellated meshes or at pixels containing a silhouette edge that intersects a seam in a background object.

Figure 6:
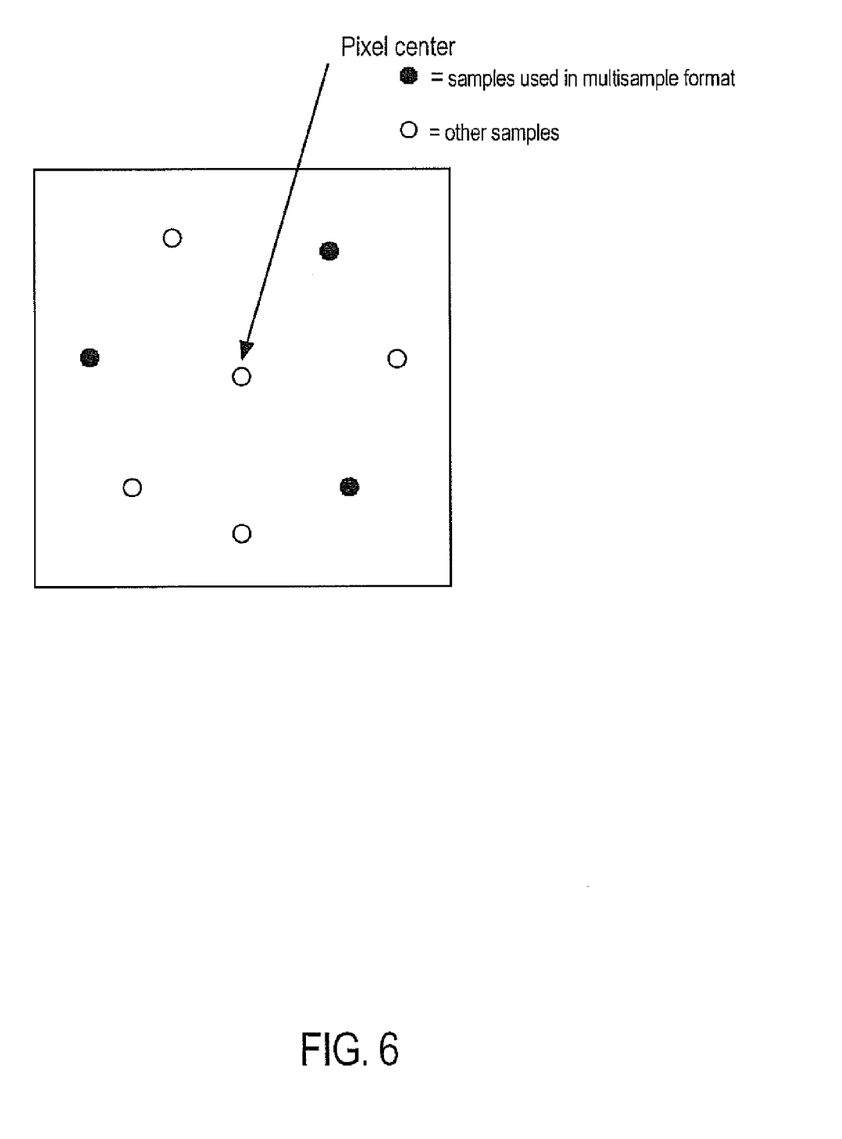
FIG. 6 illustrates one possible set of sample locations.

Rather than storing fragments with Z gradients, as in the other formats, multisample format stores color and Z values at a few (typically 2, 3, or 4) discrete sample points. The sample points for multisample format generally are a subset of the sample points used to compute the coverage mask and are selected to sample the pixel as well as possible, given the small number of samples. In this preferred embodiment, three sample points are chosen among the eight samples used to compute the coverage mask. FIG. 6 illustrates a possible set of eight sample locations, with the three samples used in multisample format highlighted.

Figure 5:
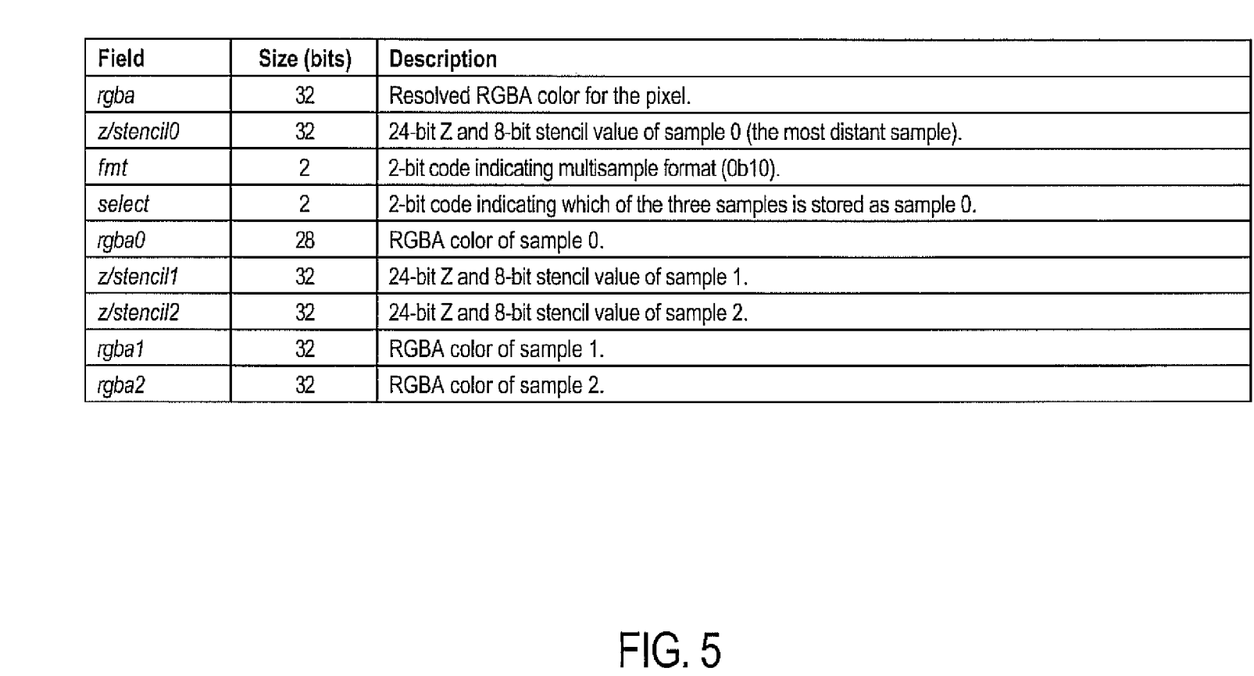
FIG. 5 illustrates storage of pixel data in multisample format.

In this preferred embodiment, pixels in multisample format are stored as shown in FIGS. 2c and 5. Given three samples, we store the color and Z values for the sample that is farthest from the viewer as sample 0. Since its Z data is stored in the primary buffer, a new fragment that lies entirely behind sample 0 can be rejected as non-visible by inspecting the primary buffer 206 alone. If primitives are loosely ordered from front-to-back, this will reduce memory bandwidth. Note that we could have made the opposite choice: choose the nearest sample as sample 0. That would allow a new fully-covering fragment to trivially overwrite a multisample pixel without examining the secondary buffer 206. The 2-bit select field indicates which of the three physical sample points is stored as sample 0. To allow room for the format and select fields, the color value for sample 0 has only seven bits of resolution per color channel.

The resolved color is computed by blending the sample colors. The blend can be a simple average, or a more complex filter function familiar to those skilled in the art.

Hierarchy of Pixel Formats.

As can be seen, the preferred embodiment provides a fixed amount of storage for each pixel, capable of handling the most complex pixel format. Most pixels in most scenes, however, can be represented using one of the simpler formats. The secondary buffer 206 is only accessed when needed, and this occurs only for a small fraction of pixel accesses, reducing memory bandwidth.

Non-Blending Fragment Processing Algorithm

The rendering system generates a plurality of fragments that comprise color, Z, Z gradient, and coverage mask data. In the preferred embodiment, when blending is disabled (i.e. color values are simply written to the frame buffer, not blended with existing frame-buffer contents), this plurality of fragments is merged with the plurality of stored pixels as follows.

Pixels in Single-Fragment Format.

When a new fragment is received from the rendering system, the primary buffer 204 is read and Z and Z gradient values are compared to see if the new fragment lies entirely behind or entirely in front of the stored fragment. In the preferred embodiment, this comparison is done at all sample locations, producing a definitive answer. An alternate embodiment could perform a conservative depth test using fragment min/max Z values only. If the new fragment lies behind, it is rejected without further processing. If the new fragment fully covers the stored fragment, it replaces the stored fragment. If the new fragment partially covers the stored fragment, a coverage mask is computed and both fragments are stored using two-fragment representation (requiring a write to the secondary buffer). Note that the Z gradients allow the coverage mask to be computed correctly for fragments that intersect.

Pixels in Two-Fragment Format.

When a new fragment is received from the rendering system, the primary buffer 204 is read and Z and Z gradient values are compared to see if the new fragment lies entirely behind the maximum Z value of this most distant fragment. If the new fragment lies entirely behind the maximum Z value, it is rejected without further processing. Otherwise, the secondary buffer 206 is read as well, and the new fragment is compared against both stored fragments. If the new fragment fully covers both stored fragments, the new fragment is stored in one-fragment format. Otherwise, if any of the three fragments can be rejected because it is entirely covered, the two remaining fragments are stored in two-fragment format (with a new coverage mask). Otherwise, Z values are evaluated at the three multisample points (using Z gradient information) and these Z values and the corresponding fragment colors are stored in multisample format.

Pixels in Multisample Format.

When a new fragment is received from the rendering system, the primary buffer 204 is read and the minimum fragment Z value is compared against the distant Z value stored in z0. If the new fragment lies entirely behind this maximum Z value, it is rejected without further processing. Otherwise, the secondary buffer 206 is read as well, and the fragment's Z values are evaluated at each of the three sample points and compared against the previously stored samples. If the new fragment covers all samples, the new fragment is stored in one-fragment format. Otherwise, any covered sample points are updated with the new fragment's color and sampled Z and the pixel is stored in multisample format.

Blending Fragment-Processing Algorithm.

In a non-antialiased system, blending causes rendered pixel colors to be mathematically combined with pixel colors stored in the frame buffer. The blending operation is controlled by a variety of render state variables. In a supersampling or multisampling antialiased system, blending occurs at the sample level, rather than the pixel level. In an A-buffer system, blending operations must be defined on fragments. Depending on the overlap of an incoming fragment with a fragment or fragments stored in the frame buffer, no action may be taken, the existing fragment(s) may be updated, or existing fragments may be split when an incoming fragment partially overlaps an existing fragment or fragments. This results in a more complicated set of transitions between pixel formats. The blended fragment-processing algorithm is described below.

Pixels in Single-Fragment Format.

When a new fragment is received from the rendering system, the primary buffer 204 is read and Z and Z gradient values are compared to see if the new fragment lies entirely behind or entirely in front of the stored fragment. If the new fragment lies behind, it is rejected without further processing. If the new fragment fully covers the stored fragment, its color value is blended with the stored fragment's color value and the blended color value replaces the color of the stored fragment. If Z writes are enabled, the fragment Z and Z slope values are updated with the values from the new fragment. Otherwise, the fragment Z and Z slope values remain unchanged.

If the new fragment partially covers the stored fragment, the portion of the pixel that is covered is written as a separate fragment whose color value is the blended color and whose Z and Z slope values are updated or not, as described above. The original fragment is retained. The pair of fragments are written in two-fragment representation with the respective fragment coverages encoded in the coverage mask. Note that this update requires a write to the secondary buffer 206.

Pixels in Two-Fragment Format.

When a new fragment is received from the rendering system, the primary buffer 204 is read and Z and Z gradient values are compared to see if the new fragment lies entirely behind the maximum Z value of this most distant fragment. If the new fragment lies entirely behind the maximum Z value, it is rejected without further processing. Otherwise, the secondary buffer 206 is read as well, and the new fragment is compared against both stored fragments.

If the new fragment fully covers both stored fragments (i.e. fully covers the pixel), the new fragment color is blended with the existing fragment colors and the blended fragment colors replace the stored colors. The Z/Zslope values are updated or not based on the Z write enable.

If the new fragment covers exactly one stored fragment, the covered fragment's color and Z/Zslope values are updated as described above.

If the new fragment partially covers one or both fragments, the pixel is converted to multisample format, and the new fragment color is blended with the sample color of any sample(s) it covers. Z values are set to the interpolated Z value for the new fragment (or not), depending on the Z write enable.

Pixels in Multisample Format.

When a new fragment is received from the rendering system, the primary buffer 204 is read and the minimum fragment Z value is compared against the distant Z value stored in z0. If the new fragment lies entirely behind this maximum Z value, it is rejected without further processing. Otherwise, the secondary buffer 206 is read as well, and the fragment's Z values are evaluated at each of the three sample points and compared against the previously stored samples. Samples that are covered have their colors updated with the blended color value. Z values of covered samples are updated or not, depending on the Z write enable. Samples that are not covered are unchanged. The pixel remains in multisample format.

Multipass Rendering

Multipass rendering is done by rendering an object (or objects) multiple times with blending enabled. The Z plane of an incoming fragment (defined by the Z and Z gradient values of the fragment) can be compared exactly against the Z plane of existing fragments in one-fragment or two-fragment formats. The Z plane of an incoming fragment can be evaluated at the three sample points and compared exactly against the stored sample Z values. Whatever the disposition of the fragment from an earlier rendering pass, if any portion of that fragment is visible in the pixel format, a Z comparison with the same fragment from a subsequent pass will match. This meets the requirement of correctly supporting multipass algorithms.

Extensions and Variations

The preferred embodiment described above represents one way the invention may be practiced. The following sections, without being exhaustive, describe enhancements or variations that are also within the scope of the invention.

Dynamically Allocated Storage.

The preferred embodiment above provides a fixed amount of storage for all pixels, regardless of their format. Since most pixels in most applications are simple one-fragment pixels, much of the additional storage for complex pixels goes unused. In an alternate embodiment of the invention, secondary storage for complex pixels is allocated from one or more storage pools. This reduces the overall storage required, and could be a desirable tradeoff for applications in which the scene complexity is controlled, as in a game console.

Centroid z Sampling

In the preferred embodiment described above, fragments contain Z gradient information, which describes how Z values for the fragment vary across the pixel. This bandwidth and storage may be too great for certain applications. It has been determined that Z values sampled at pixel centers are insufficient to avoid noticeable artifacts from background surfaces punching through foreground surfaces.

Figure 7:
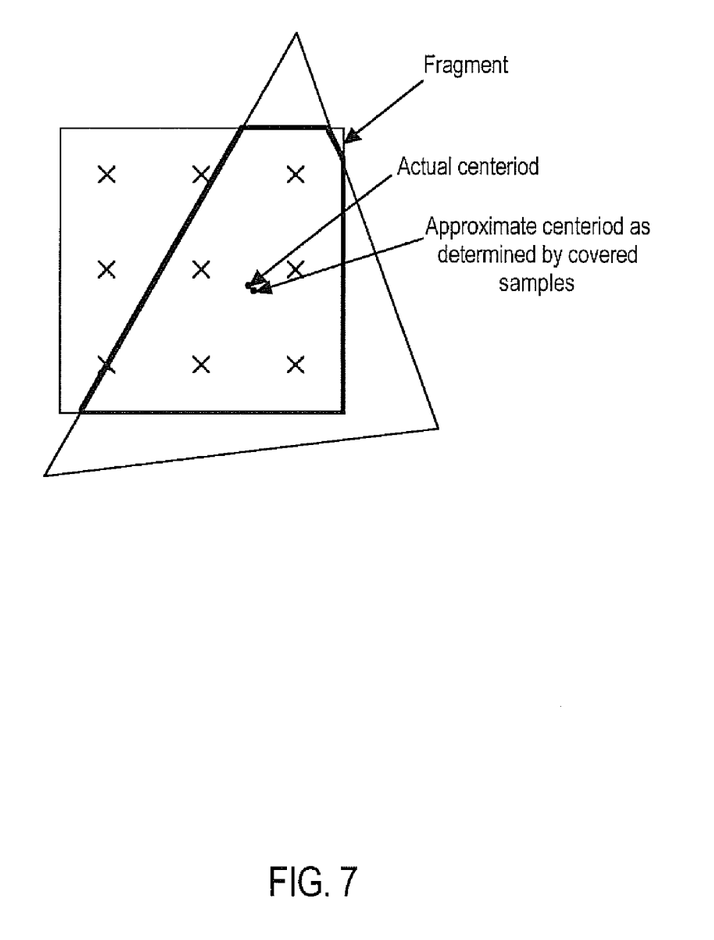
FIG. 7 illustrates the centroid of a fragment and an estimated centroid based on a coverage mask.

Z accuracy can be enhanced without storing Z gradients by sampling Z at the centroid of each fragment. A preferred embodiment utilizes a lookup table, which is indexed by the fragment coverage mask, to estimate the centroid of the samples (see FIG. 7). The table stores centroid x and centroid y at some reduced resolution (for example, 1/8 or 1/16 pixel diameter). The centroid-adjusted Z value is then computed as Zcenter+centroid x*dz/dx+centroid y*dz/dy. In this embodiment, the centroid-adjusted Z value is stored in the frame buffer without gradient information. This reduces artifacts compared to center-pixel sampling and significantly reduces the storage required per pixel.

Deferred Resolution of Pixel Colors

The preferred embodiment above maintains a resolved color buffer at all times, so resolved pixel colors are always available regardless of the pixel format. Other embodiments may resolve pixel colors in a later pass performed after rendering is complete, or may resolve pixel colors as part of video scanout.

Optimized Pixel Formats for Z Occlusion Culling

Z occlusion culling is a technique to avoid texturing and shading pixels that are known to be invisible. By appropriately choosing pixel formats, the invention can support efficient Z occlusion culling. We modify the pixel formats described above so that an occluding z value, zcull, is stored in a fixed location, regardless of the pixel format. Any fragment whose Z value lies behind this zcull value can be discarded before texturing or shading because it is known that no portion of it can be visible in the final image.

For one-fragment pixels, zcull can be computed as the center-sampled Z value offset by the sum of the absolute values of the Z gradients. This provides the Z value at the farthest corner of the pixel. Note that, given the zcull value and the Z gradients, the Z value can be reconstructed at the pixel center by subtracting the appropriate slope magnitudes from zcull. For two-fragment pixels the zcull values are determined for both fragments and the more distant one is chosen. For multisample pixels the Z value of the most distant sample is chosen as zcull.

Using this approach, no matter what the pixel format, only the zcull value needs to be examined to determine whether a newly rasterized fragment can be trivially rejected. For pixels that are not rejected, the remaining pixel data can be read later (if they are needed) and used to compute the output pixel value.

Compressed Tiles

Memory bandwidth can be reduced further by adding additional representations to the set of pixel formats described above. One such method is to store contiguous arrays of one-fragment pixels that sample the same surface as a compressed tile. In a preferred embodiment, a compressed tile is defined to be a 4×4 array of pixels that are fully covered by a single primitive. For compressed tiles, a Z value and dz/dx and dz/dy gradients are stored. Since Z values are linear in screen space, the Z values for the remainder of the pixels (and subpixel samples) can be derived from these three parameters. In this preferred embodiment, the Z values in a compressed tile require one fourth the storage of 4×4 one-fragment pixels. Since a large fraction of tiles in many scenes meet the criteria for compression, this additional representation can significantly reduce Z bandwidth.

One who is skilled in the art will recognize other tile shapes and compression formats are possible and would yield similar benefits and are within the scope of the invention.

Other Extensions

Although the present invention has been described in accordance with the embodiments shown, one of ordinary skill in the art will readily recognize that there are variations to the embodiments and those variations lie within the spirit and scope of the present invention. Accordingly, many modifications may be made by one of ordinary skill in the art without departing from the spirit and scope of the appended claims.

What is claimed is:

1. A method for rendering a plurality of pixels, the method comprising:
   providing a respective storage area in a computer memory for each of the plurality of pixels, wherein each respective storage area comprises a substantially equal allocation of memory, and wherein further each respective storage area comprises a color buffer, a primary buffer, and a secondary buffer, wherein each primary buffer has smaller capacity than a corresponding secondary buffer;
   providing a plurality of format levels for a respective pixel of the plurality of pixels, the plurality of format levels comprising: a first format level to store one fragment in a corresponding primary buffer; a second format level to store two fragments in the corresponding primary buffer and a corresponding secondary buffer; and a third format level to store a plurality of discrete sample points of the respective pixel in the corresponding primary buffer and the secondary buffer,
   wherein fragments or discrete sample points in different format levels are stored in different formats,
   wherein each color buffer stores a comprehensive color value of a surface visible at a corresponding pixel, and
   wherein each primary buffer comprises a format flag indicating a format level currently used for a corresponding pixel.

2. The method of claim 1,
   wherein a respective primary buffer of the first format level is configured to store a single fragment comprising a Z value, a stencil, Z gradients, and Z gradient signs, and wherein a secondary buffer of the first format level is unused;

wherein a respective primary buffer of the second format level is configured to store: a Z value of the respective first fragment; a stencil of the respective first fragment; Z gradients the respective first fragment; and Z gradient signs the respective first fragment, and wherein a respective secondary buffer of the second format level is configured to store: a Z value of the respective second fragment, stencil of the respective second fragment, Z gradients of the respective second fragment, color values of the respective first fragment and the respective second fragment, and a respective coverage mask; and wherein a respective primary buffer of the third format level is configured to store: a Z value and a stencil of a respective first sample point; a color value of the respective first sample point; a format code; and a selection code identifying a sampling point that is assigned as the respective first sample point, wherein a respective secondary buffer of the third format level is configured to store: Z values, stencils, and color values of a respective second point and a respective third sampling point.

3. The method of claim 2, wherein the each color buffer is allocated with 32 bits, wherein the each primary buffer is allocated with 64 bits, and wherein each secondary buffer is allocated with 128 bits.

4. The method of claim 2 further comprising:
providing a new fragment to a respective pixel stored in the first format level;
comparing Z values and Z gradients between a new fragment and a respective single fragment stored in the respective primary buffer of the first format level;
rejecting the new fragment without further processing upon determination that the new fragment lies behind the single fragment; and
replacing the single fragment with the new fragment if the new fragment fully covers the single fragment.

5. The method of claim 4 further comprising, upon determination that the new fragment partially covers the single fragment, computing a coverage mask, and storing both the new fragment and the single fragment in the second format level.

6. The method of claim 5, wherein the coverage mask is derived from Z gradients of the new fragment and the single fragment.

7. The method of claim 2, further comprising:
providing a new fragment for a respective pixel stored in the second format level;
inspecting a respective primary buffer associated with the respective pixel to determine a location of the new fragment relative to a first fragment in the respective pixel; and
rejecting the new fragment without inspecting the secondary buffer associated with the respective pixel if the new fragment lies entirely behind the first fragment in the respective pixel.

8. The method of claim 7 further comprising:
inspecting the secondary buffer of the respective pixel to determine the location of the new fragment relative to the first and the second fragments in the respective pixel;
storing the new fragment in the first format level if the new fragment fully covers the respective pixel;
rejecting a fragment if the fragment is entirely covered by any two of the first, the second and the new fragment; and
writing the new, the first and the second fragment in the third format level if none of first, the second and the new fragments are fully covered.

9. The method of claim 8, wherein the location of the new fragment relative to the first and the second fragments are determined based on Z values thereof.

10. The method of claim 9, wherein respective Z values are calculated at or near respective fragment centroid.

11. The method of claim 2, wherein a first sample point stored in a respective primary buffer corresponds to a farthest sample point with reference to a viewer; further comprising:
providing a new fragment for a respective pixel stored in the third format level;
inspecting the primary buffer associated with the respective pixel to determine a location of the new fragment relative to the first sample point; and
rejecting the new fragment without inspecting the secondary buffer associated with the respective pixel if the new fragment lies entirely behind the first sample point.

12. The method of claim 11, further comprising: inspecting the secondary buffer associated with the respective pixel;
comparing Z values between the new fragment and the first, a second and a third sample points;
if the new fragment covers all of the first, the second and the third sample points, storing the new fragment in the first format level; and
if not, updating the respective storage area with the new fragment in either the second format level or the third format level.

13. The method of claim 12 further comprising blending colors of the new fragment with color values of the first, the second, and the third sample points in accordance with Z values thereof.

14. The method of claim 2, wherein a portion of the respective storage area is on a rendering chip.

15. The method of claim 14, wherein the respective storage area is entirely on a rendering chip.

16. The method of claim 2, wherein an additional format level is provided for contiguous arrays of simple pixels whose data can be compressed.

17. The method of claim 2, wherein each primary buffer of the first format level provides sufficient storage to fully represent simple pixels.

18. The method of claim 2 further comprising sampling for the first and the second format level at vertices in a tessellated mesh.

19. The method of claim 1, wherein the comprehensive color value provides a full resolution color data for the corresponding pixel, and wherein the compressive color is calculated by blending color values of fragments or sampling points stored in the respective storage area.

20. The method of claim 1, wherein the first format level is used for pixels in which one surface is visible, the second format level for pixels in which two surfaces are visible, and the third format level is used for pixels in which at least three surfaces are visible.

21. A system for rendering images, the system comprising:
a rendering system; and
a respective storage area in a computer memory for each of a plurality of pixels, wherein each respective storage area comprises a substantially equal allocation of memory, and wherein further each respective storage area comprises a color buffer, a primary buffer, and a secondary buffer wherein each primary buffer has smaller capacity than a corresponding secondary buffer,
wherein a respective pixel is provided with a plurality of format levels comprising: a first format level to store one fragment in a corresponding primary buffer; a second format level to store two fragments in the corresponding primary buffer and a corresponding secondary buffer;

and a third format level to store a plurality of discrete sample points of the respective pixel in the corresponding primary buffer and the secondary buffer, wherein fragments or discrete sample points in different format levels are stored in different formats, wherein each color buffer stores a comprehensive color value of a surface visible at a corresponding pixel, and wherein each primary buffer comprises a format flag indicating a format level currently used for a corresponding pixel.

22. The system of claim 21, wherein a respective primary buffer of the first format level is configured to store a single fragment comprising a Z value, a stencil, Z gradients, and Z gradient signs, and wherein a secondary buffer of the first format level is unused;

wherein a respective primary buffer of the second format level is configured to store: a Z value of the respective first fragment; a stencil of the respective first fragment; Z gradients the respective first fragment; and Z gradient signs the respective first fragment, and wherein a respective secondary buffer of the second format level is configured to store: a Z value of the respective second fragment, stencil of the respective second fragment, Z gradients of the respective second fragment, color values of the respective first fragment and the respective second fragment, and a respective coverage mask; and wherein a respective primary buffer of the third format level is configured to store: a Z value and a stencil of a respective first sample point; a color value of the respective first sample point; a format code; and a selection code identifying a sampling point that is assigned as the respective first sample point, wherein a respective secondary buffer of the third format level is configured to store: Z values, stencils, and color values of a respective second point and a respective third sampling point.

23. The system of claim 22, wherein the each color buffer is allocated with 32 bits, wherein the each primary buffer is allocated with 64 bits, and wherein each secondary buffer is allocated with 128 bits.

24. The system of claim 22, further comprising:

providing a new fragment to a respective pixel stored in the first format level;

comparing Z values and Z gradients between a new fragment and a respective single fragment stored in the respective primary buffer of the first format level;

rejecting the new fragment without further processing upon determination that the new fragment lies behind the single fragment; and replacing the single fragment with the new fragment if the new fragment fully covers the single fragment.

25. The system of claim 24 further comprising, upon determination that the new fragment partially covers the single fragment, computing a coverage mask, and storing both the new fragment and the single fragment in the second format level.

26. The system of claim 25, wherein the coverage mask is derived from Z gradients of the new fragment and the single fragment.

27. The system of claim 22, further comprising:

providing a new fragment for a respective pixel stored in the second format level;

inspecting a respective primary buffer associated with the respective pixel to determine a location of the new fragment relative to a first fragment in the respective pixel; and rejecting the new fragment without inspecting the secondary buffer associated with the respective pixel if the new fragment lies entirely behind the first fragment in the respective pixel.

28. The system of claim 27 further comprising:

inspecting the secondary buffer of the respective pixel to determine the location of the new fragment relative to the first and the second fragments in the respective pixel;

storing the new fragment in the first format level if the new fragment fully covers the respective pixel;

rejecting a fragment if the fragment is entirely covered by any two of the first, the second and the new fragment; and writing the new, the first and the second fragment in the third format level if none of first, the second and the new fragments are fully covered.

29. The system of claim 28, wherein the location of the new fragment relative to the first and the second fragments are determined based on Z values thereof.

30. The system of claim 29, wherein respective Z values are calculated at or near respective fragment centroid.

31. The system of claim 22, wherein a first sample point stored in a respective primary buffer corresponds to a farthest sample point with reference to a viewer; further comprising:

providing a new fragment for a respective pixel stored in the third format level;

inspecting the primary buffer associated with the respective pixel to determine a location of the new fragment relative to the first sample point; and rejecting the new fragment without inspecting the secondary buffer associated with the respective pixel if the new fragment lies entirely behind the first sample point.

32. The system of claim 31, further comprising:

inspecting the secondary buffer associated with the respective pixel;

comparing Z values between the new fragment and the first, a second and a third sample points;

if the new fragment covers all of the first, the second and the third sample points, storing the new fragment in the first format level; and if not, updating the respective storage area with the new fragment in either the second format level or the third format level.

33. The system of claim 32, further comprising blending colors of the new fragment with color values of the first, the second, and the third sample points in accordance with Z values thereof.

34. The system of claim 22, wherein an additional format level is provided for contiguous arrays of simple pixels whose data can be compressed.

35. The system of claim 22, wherein each primary buffer of the first format level provides sufficient storage to fully represent simple pixels.

36. The system of claim 21, wherein the comprehensive color value provides a fill resolution color data for the corresponding pixel, and wherein the compressive color is calculated by blending color values of fragments or sampling points stored in the respective storage area.

37. The system of claim 21, wherein the first format level is used for pixels in which one surface is visible, the second format level for pixels in which two surfaces are visible, and the third format level is used for pixels in which at least three surfaces are visible.

38. The system of claim 21, wherein a portion of the respective storage area is on a rendering chip.

39. The system of claim 21, wherein the respective storage area is entirely on a rendering chip.

* * * * *